(12) United States Patent
Tamura et al.

(10) Patent No.: US 8,808,651 B2
(45) Date of Patent: Aug. 19, 2014

(54) INDUSTRIAL SALT AND APPARATUS AND PROCESS FOR PRODUCING INDUSTRIAL SALT

(75) Inventors: Noritoshi Tamura, Kumagaya (JP);
Shinichiro Saito, Kumagaya (JP);
Yoshinobu Tatsumi, Kumagaya (JP)

(73) Assignee: Taiheiyo Cement Corporation, Tokyo (JP)

( * ) Notice: Subject to any disclaimer, the term of this patent is extended or adjusted under 35 U.S.C. 154(b) by 487 days.

(21) Appl. No.: 13/128,183

(22) PCT Filed: Apr. 15, 2009

(86) PCT No.: PCT/JP2009/057562
§ 371 (c)(1),
(2), (4) Date: Jul. 8, 2011

(87) PCT Pub. No.: WO2010/055703
PCT Pub. Date: May 20, 2010

(65) Prior Publication Data
US 2011/0305905 A1 Dec. 15, 2011

(30) Foreign Application Priority Data
Nov. 12, 2008 (JP) ................................ 2008-289753

(51) Int. Cl.
| B01D 47/00 | (2006.01) |
| B01D 53/46 | (2006.01) |
| B01D 53/56 | (2006.01) |
| B01D 53/86 | (2006.01) |
| B01J 8/00 | (2006.01) |

(52) U.S. Cl.
USPC ................ 423/210; 423/242.1; 95/1; 95/230; 96/376; 106/751

(58) Field of Classification Search
USPC ........... 95/1, 271, 230; 106/751; 96/408, 376; 423/210, 242.1
See application file for complete search history.

(56) References Cited

U.S. PATENT DOCUMENTS

| 7,799,297 B2 * | 9/2010 | Saito ............................. 423/210 |
| 7,947,242 B2 * | 5/2011 | Saito et al. ................. 423/242.1 |
| 8,038,768 B2 * | 10/2011 | Komatsu et al. .................... 95/1 |
| 8,114,190 B2 * | 2/2012 | Komatsu et al. .................... 95/1 |
| 8,551,223 B2 * | 10/2013 | Saito et al. ....................... 95/242 |

FOREIGN PATENT DOCUMENTS

| JP | 200875139 A | 4/2008 |
| JP | 2008190019 A | 8/2008 |
| WO | WO-2006035630 A | 4/2006 |

\* cited by examiner

*Primary Examiner* — Leszek Kiliman
(74) *Attorney, Agent, or Firm* — Stetina Brunda Garred & Brucker

(57) ABSTRACT

To provide a low price industrial salt by reducing facility and operation costs without electro-deposition and crystallization and through reduction in quantity of chemicals used. An industrial salt S obtained by the steps of: extracting a part of combustion gas from a kiln exhaust gas passage running from an inlet end 12*b* of a cement kiln 12 to a bottom cyclone 13; recovering dust D from the extracted gas G2 and washing recovered dust; and drying a filtrate L1 after the washing in a gas stream. The industrial salt can be obtained by removing a calcium component from the filtrate and drying the filtrate from which the calcium component is removed in a gas stream. Further, from the filtrate can be removed sulfate radical, and drying the filtrate from which the calcium component is removed in a gas stream to obtain the industrial salt. For the drying can be used an exhaust gas discharged from a clinker cooler 12*a* and a spray drier 43 may be used for the drying. Drying in a stream provides industrial salt whose particle size is larger or equal to 20 μm and smaller or equal to 500 μm.

4 Claims, 5 Drawing Sheets

INDUSTRIAL SALT AND APPARATUS AND PROCESS FOR PRODUCING INDUSTRIAL SALT

CROSS-REFERENCE TO RELATED APPLICATIONS

The present application claims priority to International Application No. PCT/JP2009/057562 filed on Apr. 15, 2009, which claims priority to Japanese Patent Application No. 2008-289753 filed on Nov. 12, 2008.

STATEMENT RE: FEDERALLY SPONSORED RESEARCH/DEVELOPMENT

Not Applicable

BACKGROUND OF THE INVENTION

1. Technical Field of the Invention

The present invention relates to an industrial salt obtained from combustion gas exhausted from a cement kiln composing a cement burning facility, and an apparatus and a method for manufacturing the industrial salt.

2. Description of the Related Art

It is noticed that chlorine, sulfur, alkali and the like cause troubles such as preheater clogging in cement manufacturing facilities, and especially chlorine has the most harmful effect, so that cement kiln chlorine bypass systems have been used in order to remove chlorine by extracting a part of combustion gas from a kiln exhaust gas passage, which runs from an inlet end of a cement kiln to a bottom cyclone.

In this chlorine bypass system, more chlorine is distributed on fine powder side of the dust, which is generated by cooling the extracted exhaust gas, so that the dust is separated into coarse powder and fine powder by a classifier, the coarse powder is returned to a cement kiln system, and the fine powder (chlorine bypass dust) containing separated potassium chloride and the like is recovered, and is added to a cement grinding mill system (as exemplarily described in Patent Document 1).

However, in recent years, recycling of waste through conversion to cement raw material or fuel has been promoted, which increases the quantity of volatile matters such as chlorine, sulfur and alkali and the quantity of chlorine bypass dust generated as the quantity of the treated waste increases. As a result, all of the chlorine bypass dust cannot be utilized in a cement grinding process, so that the chlorine bypass dust is subject to washing treatment, however, it is anticipated that the quantity of chlorine bypass dust generated will further increase, which necessitates developments of methods for effectively utilizing the dust.

From the above-mentioned point of view, in a method of converting to cement raw material described in Patent Document 2, to wastes containing chlorine such as waste refuse incineration fly ash and chlorine bypass dust is added water to allow the chlorine in the wastes to be eluted and filtrated; desalted cake obtained is utilized as a cement raw material; and wastewater is purified and is discharged as it is or salt is recovered from the wastewater, which makes it possible to effectively utilize the wastes without causing environmental pollution.

In addition, in Patent Documents 3 and 4 is described a method for recovering industrial salt from combustion exhaust gas discharged from cement kilns. As shown in FIG. 2(b), in this method, dust (chlorine bypass dust) contained in a part of combustion gas extracted from a cement kiln combustion gas is collected; the chlorine bypass dust is washed so as to be separated into cake and filtrate; from the separated filtrate is removed heavy metals; from treated water is removed calcium components; the treated water is separated into concentrated salt water and desalted water through an electrodeposition device; and finally from the concentrated salt water is recovered industrial salt including alkali metal salt through crystallization.

PRIOR ART PATENT DOCUMENTS

Patent document 1: World Patent Publication WO97/21638 pamphlet
Patent document 2: Japanese Patent Publication Heisei 11-100243 gazette
Patent document 3: Japanese Patent Publication 2005-314178 gazette
Patent document 4: Japan Patent No. 4121418 gazette However, in the method for converting to cement raw material described in the above Patent Document 2, when desalting the chlorine bypass dust, pH of wastewater is adjusted by using hydrochloric acid and others; pH is adjusted by adding chemicals with ferrous ion having reducing function; removing heavy metals such as selenium; and then the wastewater is required to be discharged to sewage or ocean. Further, in order to reduce selenium concentration in wastewater to a safety level, for instance, to 0.1 mg-Se/l when discharged to sewage, ferrous chloride (FeCl2) as a reducing agents is required more or equal to 8000 mg-Fe2+/l, so that a large amount of reduction agent is consumed to remove selenium, resulting in a problem of skyrocketing operation cost.

Further, in the technique described in Patent Documents 3 and 4, an electro-deposition device and a crystallizer are required to be installed to recover industrial salt, which increases facility cost. In addition, heat energy for evaporating water required to recover industrial salt from chlorine bypass dust and cost of chemicals for treatment are increased, resulting in skyrocketing operation cost also.

Especially, when using a crystallizer, depending on the quantity of water to be evaporated, a large amount of sodium chloride can be crystallized and concentrated in a crystallization can of the crystallizer. As industrial salt, a salt with high potassium chloride concentration is preferable, however, sodium chloride concentrated in the crystallization can is irregularly mixed to recovered salt (industrial salt), accordingly, which causes concentration of potassium chloride to be decreased, resulting in a factor fluctuating purity of potassium chloride. As a result, quality of industrial salt is susceptible to fluctuate, which causes a problem that skill is necessary to suppress fluctuation in components. In addition, in the crystallizer, on an inner wall of the crystallization can are adhered crystals, so that there is an aspect that the crystallization can is susceptible to clogging also, which necessitates periodical washing, resulting in difficulty in stable continuous operation.

The present invention has been made in consideration of the above conventional art, and the object thereof is to provide an industrial salt, industrial salt manufacturing apparatus and industrial salt manufacturing method, in which without electro-deposition and crystallization, through reduction in quantity of chemicals used, facility and operation costs can be decreased to manufacture industrial salt, in addition, quality of the salt can be stabilized by suppressing fluctuation in components thereof.

SUMMARY OF THE INVENTION

To achieve the above object, the present invention relates to an industrial salt, and the salt is characterized by being obtained by the steps of: extracting a part of combustion gas from a kiln exhaust gas passage running from an inlet end of a cement kiln to a bottom cyclone; recovering dust from the extracted gas and washing recovered dust; and drying a filtrate after the washing in a gas stream.

With this invention, a filtrate is dried in a gas stream, so that sodium chloride is not concentrated in a drying process, which allows fluctuation in concentration of sodium chloride in the industrial salt to be suppressed. In addition, since all of the ions contained in sprayed filtrate are crystallized, sprayed components can directly be utilized as components of the industrial salt as they are. With these, fluctuation in components of industrial salt can be suppressed, and it becomes possible to mass-produce industrial salt with stable quality.

Further, troubles in a drying device due to adhesion can be suppressed, which eliminates clogging of the device and trouble in cleaning the device. In addition, besides chemicals for removing calcium components, facilities such as an electrodeposition device and a crystallizer become unnecessary, further cost of power used for the electrodeposition device and heavy oil used for the crystallization also become unnecessary, which remarkably reduce facility cost and operation cost, resulting in a low price industrial salt.

The above industrial salt can be obtained by removing a calcium component from the filtrate and drying the filtrate from which the calcium component is removed in a gas stream, and it is possible to obtain the industrial salt by removing sulfate radical from the filtrate, and drying the filtrate from which the sulfate radical is removed in a gas stream. With these, although operation cost slightly increases, purity of potassium chloride can be increased, which provides high purity industrial salt with reduced price in comparison to conventional one.

The industrial salt may be obtained by removing heavy metals from the filtrate after the washing, and drying the filtrate from which the heavy metals are removed in a gas stream, which can provide an industrial salt with higher quality.

To dry the industrial salt, an exhaust gas discharged from a clinker cooler can be utilized, which can reduce operation cost for drying the filtrate from which the heavy metals are removed and provide a low price industrial salt.

For the above drying can be utilized a spray drier, a spray flow pelletizing and drying device or a gate drier, allowing industrial salt with desired particle size to be obtained without wastewater treatment and others with ease.

It is possible to make particle size of the industrial salt after dried in the gas stream larger or equal to 20 μm and smaller or equal to 500 μm, which can provide industrial salt for various uses.

Further, the present invention relates to an industrial salt manufacturing apparatus, and the apparatus is characterized by comprising: an extracting device for extracting a part of combustion gas from a kiln exhaust gas passage running from an inlet end of a cement kiln to a bottom cyclone; a dust collector for recovering dust in a gas extracted by the extracting device; a washing device for washing dust recovered by the dust collector; and a drier for drying a filtrate generated by washing in the washing device in a gas stream to obtain an industrial salt. With this invention, in the same manner as the above-mentioned inventions, facility cost and operation cost can be reduced to produce a low price industrial salt, and fluctuation in components of the industrial salt can be suppressed to obtain industrial salt with stable quality as well.

Still further, the present invention relates to an industrial salt manufacturing method, and the method is characterized by comprising the steps of: extracting a part of combustion gas from a kiln exhaust gas passage running from an inlet end of a cement kiln to a bottom cyclone; recovering dust from the extracted gas and washing recovered dust; and drying a filtrate after the washing in a gas stream to obtain industrial salt. With this invention, in the same manner as the above-mentioned inventions, facility cost and operation cost can be reduced to produce a low price industrial salt, and fluctuation in components of the industrial salt can be suppressed to obtain industrial salt with stable quality as well.

In the above industrial salt manufacturing method, it is possible to adjust quantity of water for washing the dust or/and quantity of the dust supplied to the washing device to adjust chlorine concentration of the filtrate more or equal to a target value, in addition, it is also possible to measure chlorine concentration of the filtrate and adjust the quantity of water for washing the dust or/and the quantity of the dust supplied to the washing device in accordance with the measurement results. With this, chlorine concentration of the filtrate can appropriately be adjusted, which allows industrial salt with desired potassium chloride concentration to preferably be obtained.

As described above, with this invention, electrodeposition and crystallization becomes unnecessary and so on, which can reduce facility cost and operation cost to produce a low price industrial salt, and fluctuation in components of the industrial salt can be suppressed to obtain industrial salt with stable quality as well.

BRIEF DESCRIPTION OF THE DRAWINGS

FIG. 2(*b*) is a flowchart showing a conventional industrial salt manufacturing process.

Next, embodiments of the present invention will be explained with reference to figures.

DETAILED DESCRIPTION OF THE INVENTION

Figure 1:
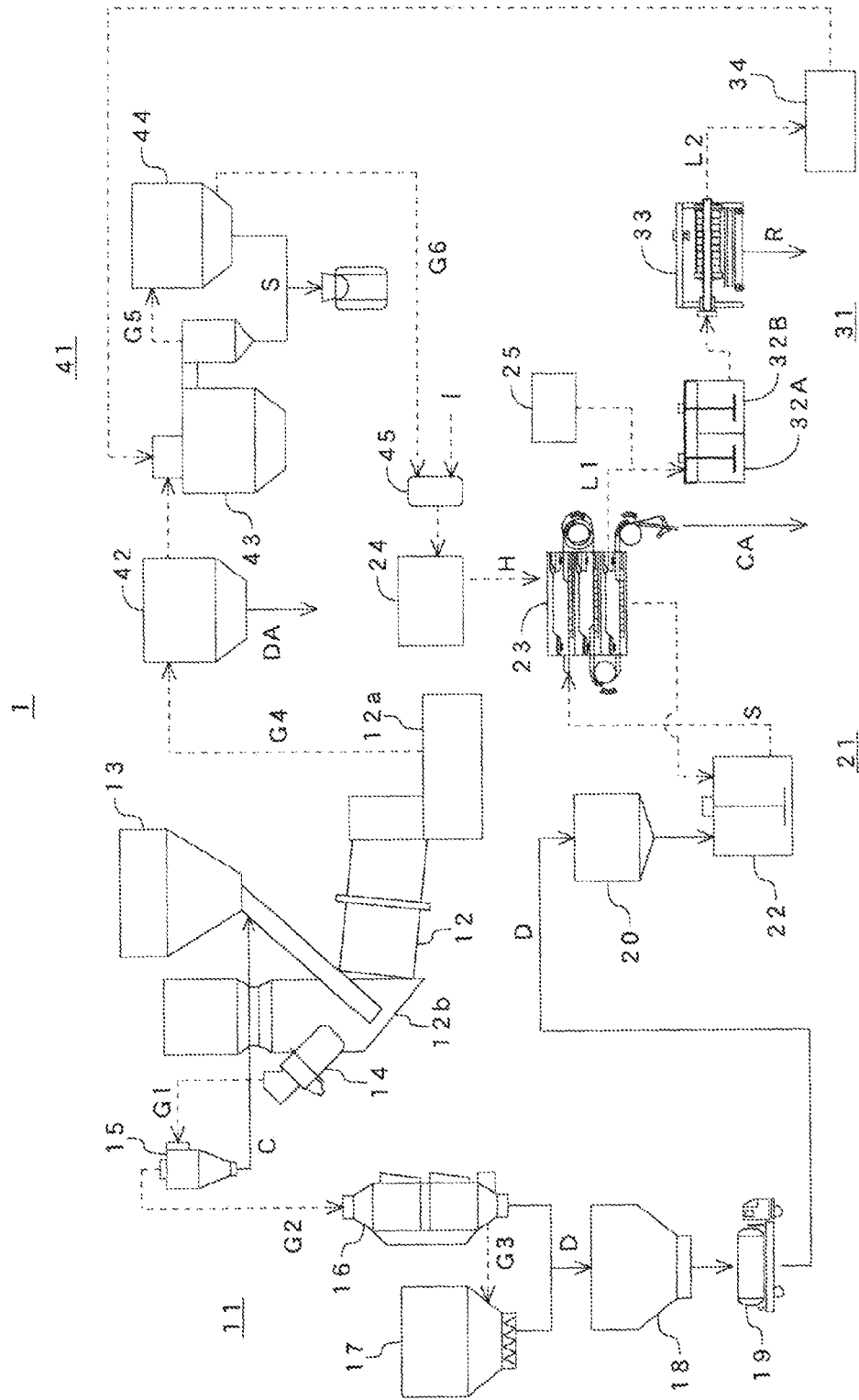
FIG. 1 is a flowchart showing an industrial salt manufacturing apparatus according to an embodiment of the present invention.

FIG. 1 shows an industrial salt manufacturing apparatus according to an embodiment of the present invention, this industrial salt manufacturing apparatus 1 roughly comprises a cement manufacturing device 11, a washing device 21, a heavy metal removing device 31 and a drying device 41.

The cement manufacturing device 11 is composed of: a cement kiln 12 with a clinker cooler 12a; an extracting device 14 (hereinafter referred to as "probe" in short) for extracting a part of combustion gas from a kiln inlet end 12b of the cement kiln 12; a classifier 15 for separating coarse powder C included in extracted gas G1; a cooler 16 for cooling exhaust gas G2 from the classifier 15; a bag filter 17 for collecting dust from the exhaust gas G3 cooled in the cooler 16; a tank 18 for storing chlorine bypass dust D collected in the cooler 16 and bag filter 17; a tank 20 for storing the chlorine bypass dust D transported by a vehicle 19. These devices and others constituting the cement manufacturing device 11 are normally used.

The washing device 21 is composed of: a dissolution bath 22 where chlorine components in the chlorine bypass dust D stored in a tank 20 are dissolved; a filtration machine 23 for solid/liquid separating slurry S discharged from the dissolution bath 22 into cake CA and filtrate L1; a hot water bath 24 for supplying hot water H to the dissolution bath 22 and the filtration machine 23; and an electric conductivity meter 25 for measuring chlorine concentration of the filtrate L1.

The hot water bath 24 is installed to store industrial water I and others that are heated with an exhaust gas G6, which is used for drying industrial salt described below, and utilized for industrial uses. The hot water H stored in the hot water bath 24 is circularly used for the washing device 21, the heavy metal removing device 31 and the drying device 41.

The heavy metal removing device 31 is composed of: a chemical reaction tank 32 (32A, 32B) for removing heavy metals from the filtrate L1 discharged from the filtration machine 23; a filter press 33 for solid/liquid separating slurry discharged from the chemical reaction tank 32 into residue R and filtrate L2; and a filtrate tank 34 for storing filtrate L2 discharged from the filter press 33.

The chemical reaction tank 32A is installed to reduce selenium by adding sodium hydrosulfide to the filtrate L1 to generate lead sulfide and thallium sulfide, then controlling pH using hydrochloric acid and adding ferrous chloride. The reason why hydrochloric acid is added is to enhance reducing effect of ferrous chloride. The chemical reaction tank 32B is installed to adjust pH by adding slaked lime to the filtrate L1 supplied from the chemical reaction tank 32A. The adjustment of pH is carried out to condense and deposit ferrous hydroxide that is generated by adding ferrous chloride.

The filter press 33 is provided to solid/liquid separate the filtrate L1, which is discharged from the chemical reaction tank 32B, into the residue R including thallium sulfide, lead sulfide, selenium and so on and the filtrate L2.

The drying device 41 is composed of: a bag filter 42 for collecting dust DA in exhaust gas a low price discharged from the clinker cooler 12a; a spray drier 43 for obtaining industrial salt S by drying the filtrate L2 stored in the filtrate tank 34; a bag filter 44 for collecting industrial salt S in exhaust gas G5 discharged from the spray drier 43; and a heating device 45 for heating industrial water I and others.

The spray drier 43 is provided with, although illustration will be omitted, a pulverization device, a hot wind introducing device, a drying chamber, a dried powder separating and collecting device, an exhaust gas treatment device and a product cooling device. The pulverization device sprays the filtrate L2 through a nozzle, and the hot wind introducing device introduces the exhaust gas G4 discharged from the clinker cooler 12a to the drying chamber.

To control particle size of the industrial salt S are appropriately adjusted quantity of liquid fed to the spray drier 43, concentration of the liquid fed to the device, temperature of the hot gas (the exhaust gas G4), quantity of the hot gas, temperature in the chamber, temperature of discharged gas, nozzle pressure, mean diameter of liquid particles and so on.

The heating device 45 is installed to heat the industrial water I and others with the exhaust gas G6 discharged from the bag filter 44 and supply the hot water H to the hot water bath 24.

Next, motion of the industrial salt manufacturing apparatus 1 with the above-mentioned construction will be explained with reference to FIG. 1.

During operation of the cement kiln 12, a part of combustion gas is extracted from the kiln inlet end 12b of the cement kiln 12 by the probe 14; coarse powder C is separated from the extracted gas G1 by the classifier 15 to return them to a kiln system; the exhaust gas G2 discharged from the classifier 15 is cooled by the cooler 16; and dust contained in the exhaust gas G3 is collected by the bag filter 17. Then, the chlorine bypass dust D recovered from the cooler 16 and the bag filter 17 is stored in the tank 18, and the chlorine bypass dust D is returned to the kiln system or transported to the tank 20 by the vehicle 19.

The chlorine bypass dust D stored in the tank 20 is supplied to the dissolution bath 2 to dissolve water-soluble chlorine components contained in the chlorine bypass dust D to the hot water H. Then, in the filtration machine 23, to a cake that is obtained by dehydrating the slurry S discharged from the dissolution bath 22 is added the hot water H, which solid/liquid separates the slurry S while washing the slurry S with water into the filtrate L1 and the cake CA. The cake CA from which chlorine components are removed is utilized as a cement raw material.

On the other hand, the filtrate L1 including chlorine components is fed to the chemical reaction tank 32A, and in the process is measured chlorine concentration with the electric conductivity meter 25. Then, with reference to the measured chlorine concentration, feed rate of the chlorine bypass dust D to the dissolution bath 22 and quantity of water for washing in the filtration machine 23 are increased and decreased to control chlorine concentration of the filtrate L1 so as to be a target value that is approximately 1.7%.

Concretely, in case that measured chlorine concentration is lower than the target value, feed rate of the chlorine bypass dust D is increased, and simultaneously, quantity of water for washing in the filtration machine 23 is decreased to raise chlorine concentration of the slurry S discharged from the dissolution bath 22. In this connection, it is not always required to increase and decrease both of the feed rates of the chlorine bypass dust D to the dissolution bath 22 and the quantity of the water for washing in the filtration machine 23, but either one of them may be increased or decreased to adjust chlorine content of the filtrate L1.

In parallel with the above, sodium hydrosulfide is added to the filtrate L1 in the chemical reaction tank 32A as a sulfurizing agent to sulfurize lead and thallium in the filtrate L1 and generate lead sulfide and thallium sulfide. In addition, after adjusting pH less or equal to 4 by adding hydrochloric acid, ferrous chloride is added to reduce selenium.

Next, from the chemical reaction tank 32A is fed the filtrate L1 to the chemical reaction tank 32B, and milk of lime is supplied to the filtrate L1 to adjust pH between 7.0 and 10.0, after that, adding ferrous chloride to allow generated ferrous hydroxide to be deposited.

The filtrate L1 discharged from the chemical reaction tank 32B is solid/liquid separated by the filter press 33 into the residue R and the filtrate L2. The residue R containing heavy metals such as lead sulfide, thallium sulfide and selenium is utilized as a cement raw material again. On the other hand, the filtrate L2 discharged from the filter press 33 is stored in the filtrate tank 34.

Next, into the spray drier 43 is introduced the exhaust gas G4 at approximately 230 that is discharged from the clinker cooler 12a and whose dust is collected by the bag filter 42 to adjust temperature of the chamber based on temperatures of hot gas and discharged gas of the spray drier 43. Then, after these temperatures become stable, the filtrate L2 of a prescribed concentration stored in the filtrate tank 34 is supplied to the spray drier 43, and the filtrate L2 is sprayed at a prescribed nozzle pressure so as to be dried with the exhaust gas G4.

After the drying, industrial salt is separated and collected by a dried powder separation and collection device, and is cooled by a product cooling device to obtain industrial salt S whose particle size is larger or equal to 20 μm and smaller or equal to 500 μm. The industrial salt S obtained by the above method is packed and delivered so as to be used as an artificial fertilizer.

The exhaust gas G4 used for drying the industrial salt S is introduced to the bag filter 44 through the exhaust gas treatment device, and after solid/liquid separation, the industrial water I is heated by the heating device 45, and resultant hot water H is stored in the hot water bath 24. On the other hand, the industrial salt S collected in the bag filter 44 is packed and delivered together with the industrial salt S dried in a gas stream by the spray drier 43.

Figure 2:
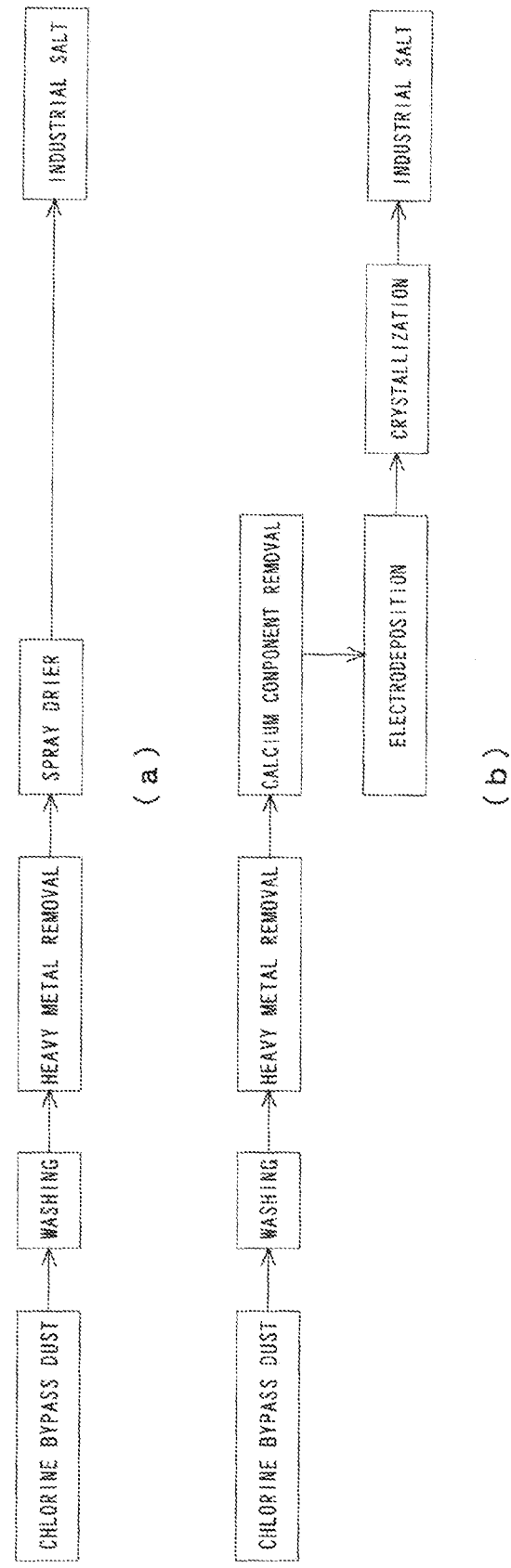
FIG. 2(*a*) is a flowchart showing an industrial salt manufacturing process according to the present invention.

As described above, in this embodiment, as shown in FIG. 2, conventionally used electro-deposition device and crystallizer become unnecessary, so that power used for the electro-deposition and heavy oil used for the crystallization become unnecessary, and chemicals for removing calcium components are unnecessary, which remarkably reduce production cost.

Further, the filtrate L2 is dried with a stream by the spray drier 43, so that sodium chloride is not concentrated in a process for drying the filtrate L2, which can prevent concentration of potassium chloride in the industrial salt S from fluctuating. In addition, in the drying by the spray drier 43, water is evaporated in a state of liquid particles, so that all of the ions contained in the sprayed filtrate L2 are crystallized, and sprayed components can directly be components of the industrial salt as they are. With these, fluctuation in components of the industrial salt S can be suppressed, which makes it possible to mass-produce the industrial salt S with stable quality. In addition, no expert skill is required to produce the industrial salt S, so that processing in short time becomes possible.

Further, in the stream drying, industrial salt is crystallized in liquid particles, and sprayed liquid particles do not contact with the inner wall of the chamber, which can avoid troubles due to adhesion. In addition, drying is performed by utilizing the exhaust gas G4 from the clinker cooler 12a, and the exhaust gas G4, which is utilized for the drying, is used for heating the hot water H for washing, which can further reduce operation cost.

Meanwhile, in the above embodiment, immediately after heavy metals are removed from the filtrate L2, the filtrate L2 is dried in a gas stream. It is also possible to separate calcium components by adding, before stream drying, potassium carbonate to the filtrate L2 from which heavy metals are removed, and its filtrate can be solid/liquid separated to remove calcium components. In this case, although costs for chemicals and others increase, purity of potassium chloride can be increased, so that a lower price industrial salt with almost the same purity compared to conventional salts obtained through electro-deposition and crystallization.

In the above case, before adding potassium carbonate, for example, pH adjusting agent such as milk of lime (alkali chemicals including calcium) can be added to adjust pH of the filtrate L2 between 8.5 and 10.0, which allows calcium components eluted to the filtrate L2 to be increased and suppresses elution of sulfate radical (sulphate ion, $SO_4{}^{2-}$), resulting in increased purity of recovered salt.

Further, in place of the removal of calcium components, sulfate radical can be removed by an electro-deposition device. In this case, for instance, pH adjusting agent such as milk of lime can be added to adjust pH of the filtrate L2 between 7.0 and 8.5, which suppresses elution of calcium components and allows concentration of sulfate radical to be increased, resulting in increased purity of recovered salt.

Still further, in the above embodiment, prior to the stream drying is removed heavy metals from the filtrate L1, depending on quantity of heavy metals contained and conditions that industrial salts are used, a process for removing heavy metals can be omitted.

Further, in the above embodiment, explanation is made in case that a part of combustion gas is extracted by the probe 14 from the kiln inlet end 12b of the cement kiln 12, however besides the kiln inlet end 12b, a part of combustion gas can be extracted from a kiln exhaust gas passage from the kiln inlet end 12b to the bottom cyclone 13.

Further, in the above embodiment, between the probe 14 and the cooler 16 is disposed the classifier 15, however, it is possible to directly introduce, without installing the classifier 15, the extracted gas from the probe 14 to the cooler 16.

In addition, in the above embodiment, when drying in the spray drier 43, the exhaust gas G4 from the clinker cooler 12a is used, however for example, it is also possible to use an exhaust gas from the top cyclone of a preheater attached to the cement kiln 12 after cooling the gas for temperature adjustment.

Further, in the above embodiment, as a drying device is used the nozzle-type spray drier 43, however, it is also possible to use a spray flow pelletizing and drying device that performs pelletization and drying at the same time, with which industrial salts with different particle sizes can be produced to deal with a variety of usages. In addition, when using a generally-used spray drier, it takes approximately 5 seconds from spraying to drying. On the other hand, using a gate drier capable of drying liquid particles in several microseconds after spraying allows an industrial salt with smaller particle size also.

Next, test examples of industrial salts and others of the present invention will be explained.

EXAMPLE 1

Figure 3:
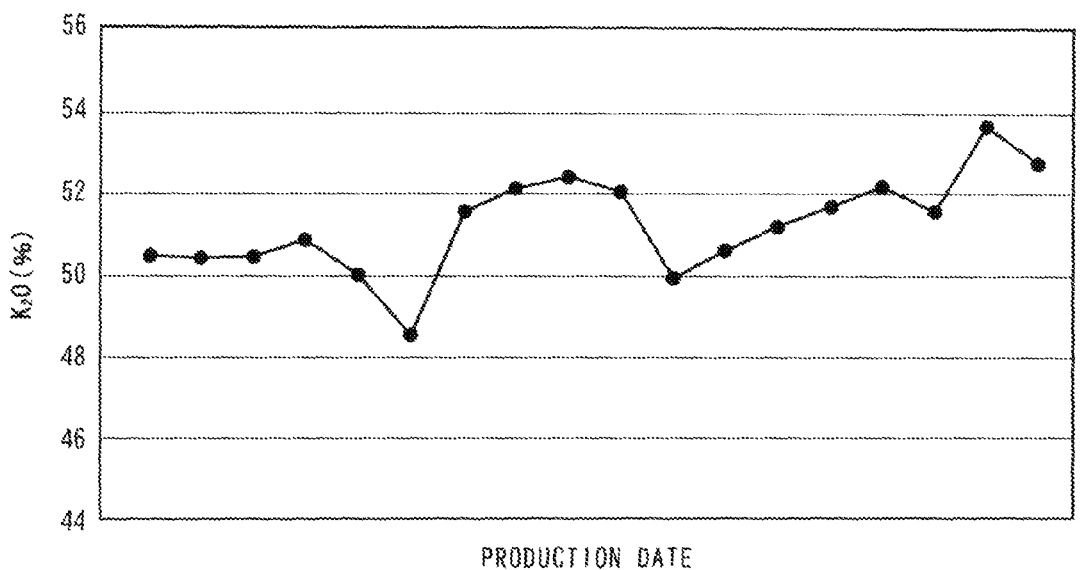
FIG. 3 is a graph showing transition of $K_2O$ concentration when producing industrial salt for several days using the industrial salt manufacturing apparatus according to the present invention.
Figure 4:
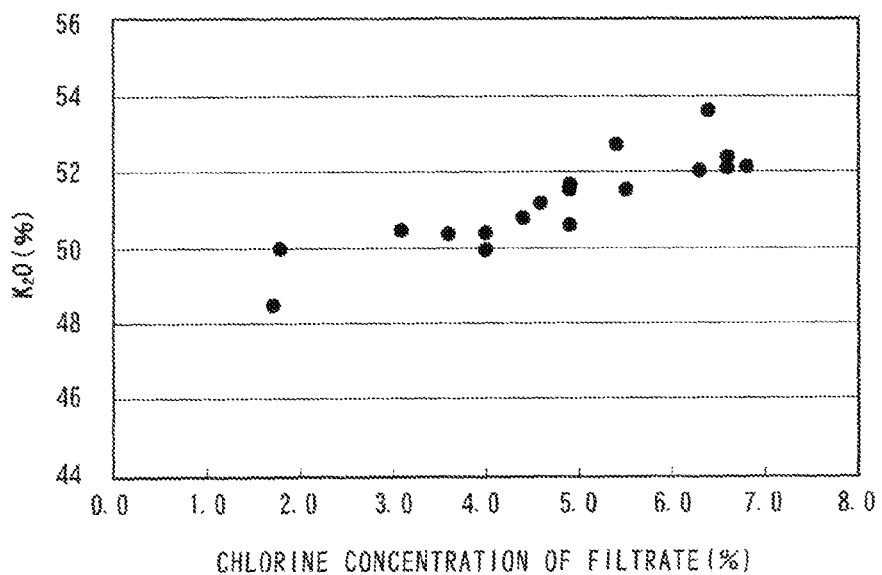
FIG. 4 is a graph showing the relation between chlorine concentration of filtrate after washing chlorine bypass dust and $K_2O$ concentration of industrial salt.
Figure 5:
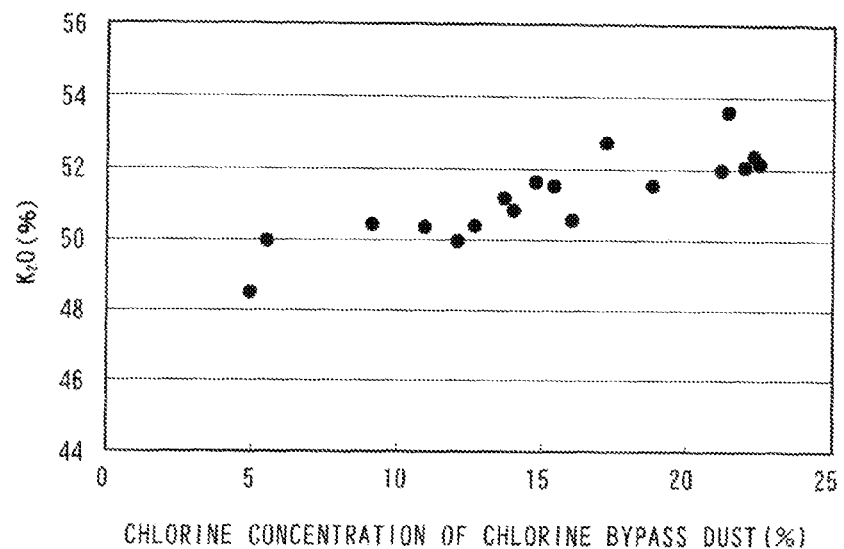
FIG. 5 is a graph showing the relation between chlorine concentration of chlorine bypass dust and $K_2O$ concentration of industrial salt.

Using the industrial salt manufacturing apparatus (manufacturing apparatus with a stream drier) shown in FIG. 1 and the conventional salt manufacturing apparatus (manufacturing apparatus with a crystallizer) shown in FIG. 2(b), industrial salt was manufactured over several days and K2O concentration in the industrial salt was measured. FIGS. 3 to 5 show measurement results when the manufacturing apparatus shown in FIG. 1 was used, and FIG. 6 shows measurement results when the manufacturing apparatus shown in FIG. 2(b) was used.

Meanwhile, FIG. 4 shows relation between chlorine concentration of the filtrate L1 from the filtration machine 23 (shown in FIGS. 1) and K2O concentration of industrial salt. And, FIG. 5 shows relation between chlorine concentration of the chlorine bypass dust D and K2O concentration of industrial salt. In FIGS. 3 to 6, K2O concentrations are mean values of industrial salt manufactured in one day.

Figure 6:
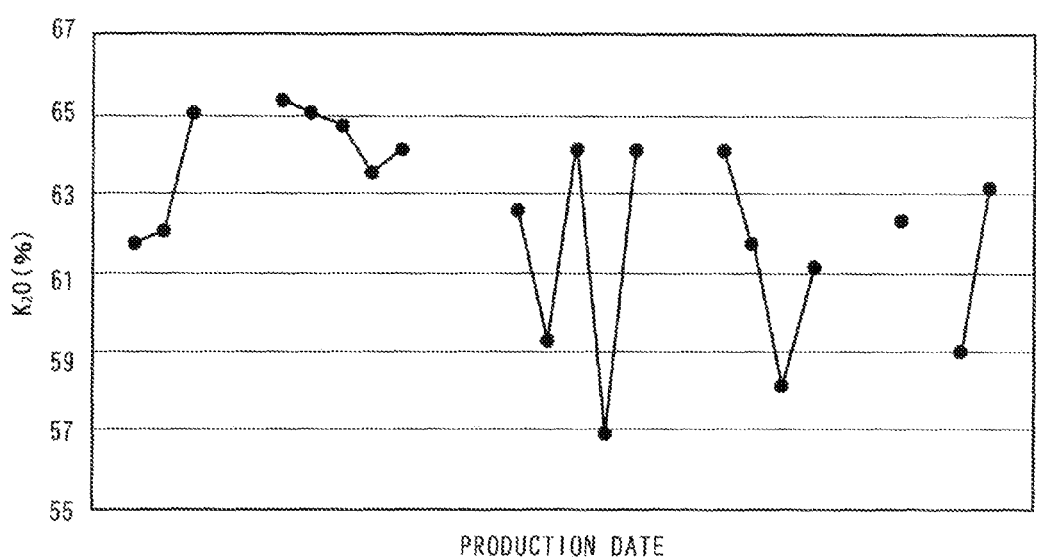
FIG. 6 is a graph showing transition of $K_2O$ concentration when producing industrial salt for several days using the conventional industrial salt manufacturing apparatus.

As clearly understood from FIGS. 3 and 6, when using the manufacturing apparatus shown in FIG. 1, in comparison to using the manufacturing apparatus shown in FIG. 2(b), fluctuation in K2O concentration can be suppressed, which allows industrial salt with stable quality to be obtained. In addition, as shown in FIGS. 3 and 4, in case of manufacturing industrial salt with the manufacturing apparatus shown in FIG. 1, it is proved that when chlorine bypass dust whose chlorine concentration is more or equal to 5% is used and chlorine concentration of the filtrate L1 is more or equal to 1.7%, industrial salt containing K2O approximately 50% or more can be obtained.

In this connection, in the above test is compared manufacturing costs of the industrial salt. When using the manufacturing apparatus shown in FIG. 1, in comparison to using the manufacturing apparatus shown in FIG. 2(b), manufacturing cost could be decreased by about 30%.

EXAMPLE 2

Figure 7:
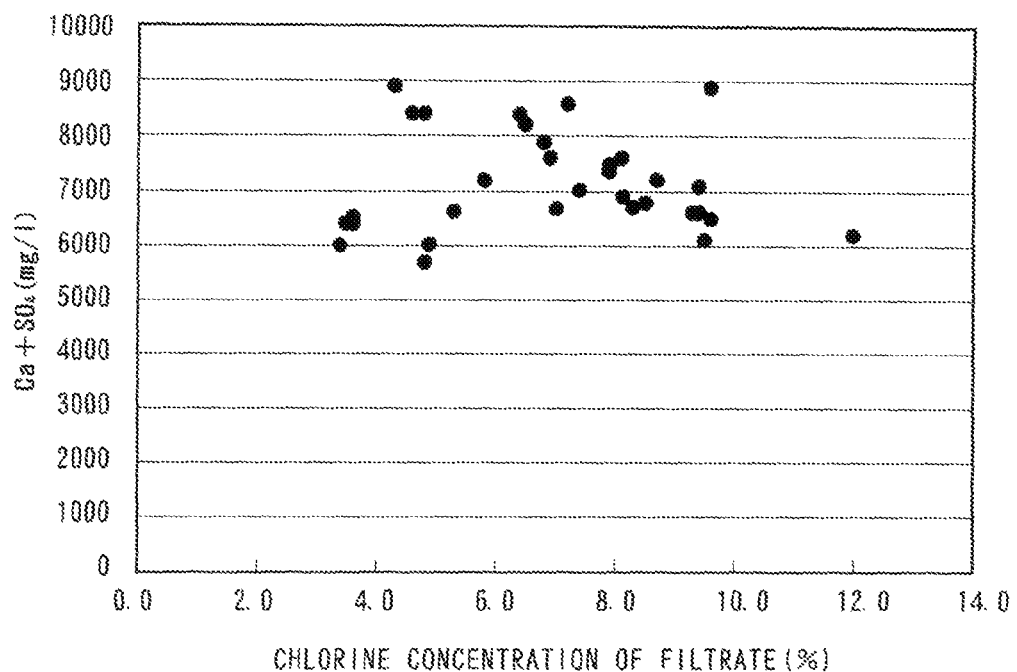
FIG. 7 is a graph showing the relation between total quantity of calcium components and $SO_4$ dissolved in filtrate after washing chlorine bypass dust and chlorine concentration of the filtrate.

In the dissolution bath 22 shown in FIG. 1, quantities of calcium components and SO4 dissolving in the filtrate L1 from the filtration machine 23 were measured while increasing chlorine concentration by increasing feed rate of chlorine bypass dust. Measurement results are shown in FIG. 7. In FIG. 7, the axis of ordinates shows total amount of calcium components and SO4 dissolving in the filtrate L1.

When feed rate of chlorine bypass dust to the dissolution bath 22 is increased, not only chlorine components but also feed rates of calcium components and SO4 will also be increased, it is proved that, as shown in FIG. 7, much calcium components and others that had been increased in quantity were shifted on the cake CA side, so that quantities of calcium components and others dissolving in the filtrate L1 do not change remarkably. From this, it is proved that even through feed rate of chlorine bypass dust is increased, chlorine concentration of the filtrate L1 can be controlled without remarkable increase of impurities.

EXAMPLE 3

Quantities of calcium components and SO4 dissolving in the filtrate L1 were measured while increasing calcium components in chlorine bypass dust. Measurement results are shown in FIG. 8.

Figure 8:
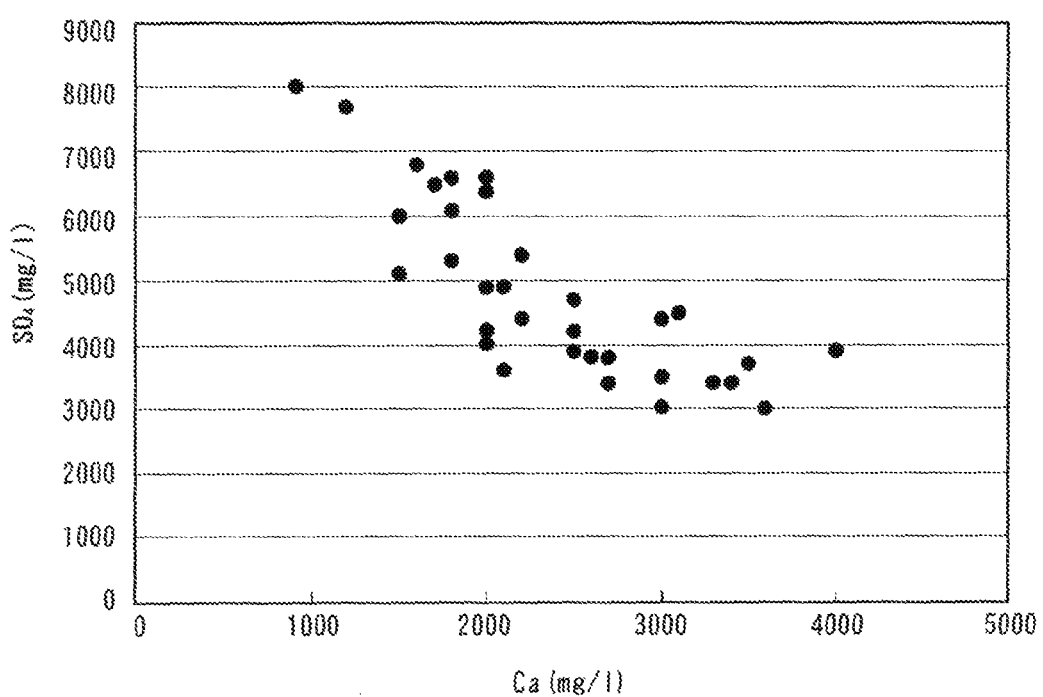
FIG. 8 is a graph showing the relation between solubilities of calcium components and $SO_4$.

As shown in FIG. 8, it is proved that solubilities of calcium components and SO4 are in inverse proportion to each other, so that, for instance, when calcium components dissolve at high concentrations, SO4 dissolves at low concentrations only. Therefore, under the condition that calcium components dissolve in the filtrate L1 at high concentrations, removing the calcium components from the filtrate L1 allows SO4 to remain in the filtrate L1 at low concentrations, which effectively increase K2O concentration in the industrial salt.

EXPLANATION OF REFERENCE NUMBERS 1 industrial salt manufacturing apparatus
11 cement manufacturing device
12 cement kiln
12a clinker cooler
12b kiln inlet end
13 bottom cyclone
14 probe
15 classifier
16 cooler
17 bag filter
18 tank
19 vehicle
20 tank
21 washing device
22 dissolution bath
23 filtration machine
24 hot water bath
25 electric conductivity meter
31 heavy metal removing device
32 (32A, 32B) chemical reaction tank
33 filter press
34 filtrate tank
41 drying device
42 bag filter
43 spray drier
44 bag filter
45 heating device

The invention claimed is:

1. An industrial salt manufacturing apparatus comprising:
an extracting device for extracting a part of combustion gas from a kiln exhaust gas passage running from an inlet end of a cement kiln to a bottom cyclone;
a dust collector for recovering dust in a gas extracted by the extracting device;
a washing device for washing dust recovered by the dust collector; and
a drier for drying a filtrate generated by washing in the washing device in a gas stream to obtain an industrial salt.

2. An industrial salt manufacturing method comprising the steps of:
extracting a part of combustion gas from a kiln exhaust gas passage running from an inlet end of a cement kiln to a bottom cyclone;
recovering dust from the extracted gas and washing recovered dust; and
drying a filtrate after the washing in a gas stream to obtain an industrial salt.

3. The industrial salt manufacturing method as claimed in claim 2, further comprising the steps of:
adjusting quantity of water for washing the dust or/and quantity of the dust supplied to the washing device; and
controlling chlorine concentration of the filtrate to more or equal to a target value.

4. The industrial salt manufacturing method as claimed in claim 3, further comprising the steps of:
measuring chlorine concentration of the filtrate; and
adjusting quantity of water for washing the dust or/and quantity of the dust supplied to the washing device in accordance with the measurement results.

* * * * *